United States Patent [19]
Mical

[11] Patent Number: 4,772,882
[45] Date of Patent: Sep. 20, 1988

[54] CURSOR CONTROLLER USER INTERFACE SYSTEM

[75] Inventor: Robert J. Mical, San Mateo, Calif.

[73] Assignee: Commodore-Amiga, Inc., Los Gatos, Calif.

[21] Appl. No.: 887,053

[22] Filed: Jul. 18, 1986

[51] Int. Cl.⁴ .............................................. G09G 3/02
[52] U.S. Cl. .................................. 340/709; 340/710; 340/721; 340/723; 340/712; 340/747; 364/521
[58] Field of Search ............... 340/724, 747, 709, 710, 340/721, 712, 711, 716, 723, 734; 364/900, 518, 521

[56] References Cited

U.S. PATENT DOCUMENTS

| Re. 31,200 | 4/1983 | Sukonick et al. | 340/709 |
| 3,757,037 | 9/1973 | Bialek | 340/711 |
| 3,987,685 | 10/1976 | Opocensky | 340/710 |
| 4,413,314 | 11/1983 | Slater et al. | 340/712 |
| 4,464,652 | 8/1984 | Lapson et al. | 340/716 |
| 4,555,700 | 11/1985 | Convis et al. | 340/721 |
| 4,559,532 | 12/1985 | Hosogoe | 340/710 |
| 4,586,035 | 4/1986 | Baker et al. | 340/712 |
| 4,587,520 | 5/1986 | Astle | 340/710 |
| 4,611,306 | 9/1986 | Crehan et al. | 364/900 |
| 4,618,858 | 10/1986 | Belch | 340/723 |
| 4,642,790 | 2/1987 | Minshull et al. | 340/747 |
| 4,646,250 | 2/1987 | Childress | 340/734 |

FOREIGN PATENT DOCUMENTS

WO82/00726 3/1982 PCT Int'l Appl. ................ 340/712

Primary Examiner—Marshall M. Curtis
Assistant Examiner—Roland K. Bowler
Attorney, Agent, or Firm—Finnegan, Henderson, Farabow, Garrett & Dunner

[57] ABSTRACT

Menu item selection is performed in a personal computer system through the use of a mouse device which has means to allow the user to call up onto the display a header block which performs the function of the menu bar and to erase the header block from the screen when menu operations are not required. Multiple menu items can be selected during the same menu session by using a pair of mouse buttons to generate a sequence of selection commands which are utilized by unique system software to accumulate plural item selections without terminating the menu operation.

16 Claims, 6 Drawing Sheets

CURSOR CONTROLLER USER INTERFACE SYSTEM

This invention relates to cursor controlled user interface systems and more particularly to the so-called "mouse-icon" type of user interface system especially adapted for use with personal computer systems.

BACKGROUND

One form of cursor controlled user interface system is described in U.S. Pat. No. 4,464,652. In such a system an input device called a "mouse" is employed by an operator (user) to move a cursor (pointer) symbol about a CRT display screen in order to generate control commands. The mouse is provided with a button to allow the operator to generate control commands to signal the selection of option choices and to perform other control functions. Option choices are made by positioning the cursor on various "menus" which are called up and presented on the screen. Individual items within a menu are selected by operating the mouse button when the cursor is positioned on the selected item.

Prior art systems of this type are limited in their capabilities due to several factors. First, a menu bar is present at all times across the top of the display screen to enable the user to call up menus. The continuous presence of the menu bar cuts down on the usable display space. Further, the single mouse button permits only a limited range of selection and control functions to be performed.

OBJECTS AND SUMMARY OF THE INVENTION

It is accordingly an object of the present invention to provide an improved cursor controlled user interface system.

Another object is to provide a cursor controlled user interface system which allows the full CRT screen to be utilized when menu operations are not being performed.

A further object is to provide a system of the type described in which multiple menu items can be selected simply and expediently through the use of particular mouse button actuation sequences.

Yet another object is to provide improved controlled software for driving a cursor controlled user interface system.

To achieve the foregoing objects and in accordance with the invention, menu item selection is performed through the use of a mouse device which has means to allow the user to call up onto the display a header block which performs the function of the menu bar and to erase the header block from the screen when menu operations are not required. Still further in accordance with the invention, multiple menu items can be selected during the same menu session by using a pair of mouse buttons to generate a sequence of selection commands which are utilized by unique system software to accumulate plural item selections without terminating the menu operation.

The accompanying drawings which are incorporated in and constitute part of the specification, illustrate a perferred embodiment of the invention and together with the description, serve to explain the principles of the invention.

DETAILED DESCRIPTION OF EMBODIMENT

Figure 1:
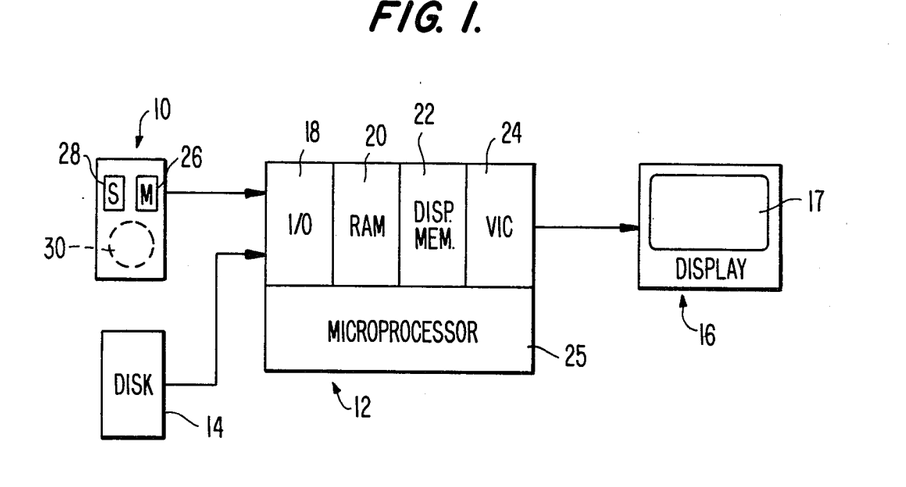
FIG. 1 is a system block diagram illustrating the basic components of an exemplary personal computer system employing the present invention.

Referring to FIG. 1, the system comprises a mouse input device 10 including a roller ball 30 and a pair of control buttons 26 and 28. The buttons actuate momentary contact switches to generate selection signals and other commands. Button 26 is referred as the menu mode button and button 28 is referred to as the select button. As is well known, the user moves the mouse 10 along a planar surface, such as a table top, to generate cursor position input commands which are supplied to the CPU 12. Roller ball 30 cooperates with a mechanism which converts motion of the mouse into x-y signals which are used by the CPU to control the position of the cursor symbol on the display screen 17 of display unit 16. One arrangement for converting motion of the roller ball 30 into x-y commands is described in the aforementioned U.S. Pat. No. 4,464,652.

The CPU 12 includes an input/output control unit 18, a random access memory (RAM) 20, a display memory 22, a video interface circuit (VIC) 24 and a microprocessor 25. These units are all well known and operate under control of the system software to process various inputs and provide the outputs necessary to generate desired textual and graphic display information on the CRT screen 17. A disk drive 14 is provided to permit the ready interchange of control and application software and to provide a source of mass storage for the system.

Display memory 22 is a specialized section of random access memory which is used to store bit patterns (pixel data) which are read out by the video interface circuit 24 in proper synchronization with the display beam of CRT unit 16 in order to provide the desired display graphics and text.

Figure 2:
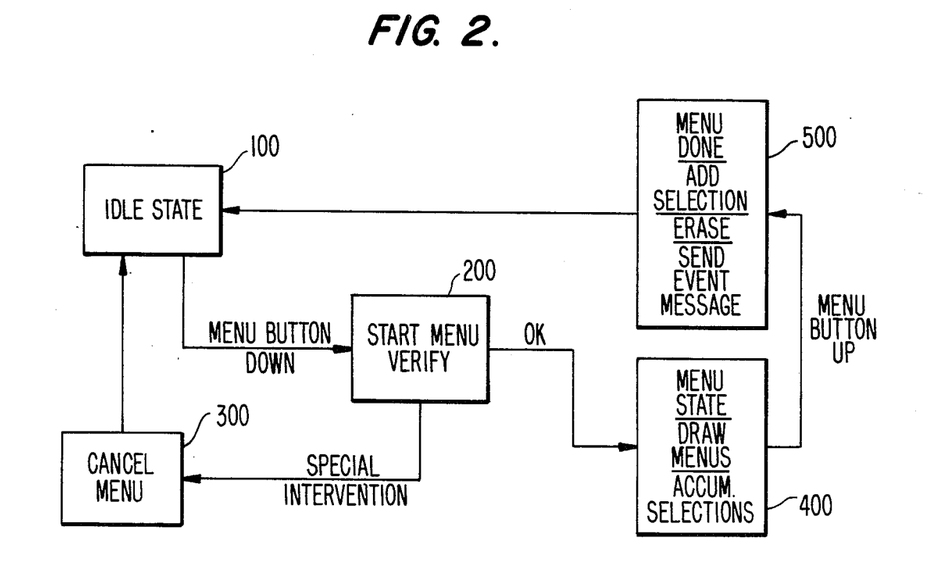
FIG. 2 is a functional state diagram showing the basic operational states utilized within the menu control system of the invention.

FIG. 2 is a state diagram showing the basic functional states into which the menu control software is organized. When menu mode button 26 is depressed by the operator, the software transfers from the Idle state 100 to the Start Menu state 200. In the latter state, verification operations are performed to determine whether the system should proceed with menu operations, or whether special circumstances exist which require intervention and cancelling of the menu operations. If intervention is called for, the system transfer to the Cancel Menu state 300 and returns to Idle. The verification and cancellation functions are not a part of the present invention and are not further described.

If the system determines that menu operations can proceed, the software transfers from state 200 to the Menu State 400. Software is executed within the Menu State to generate the text and graphics necessary to display the header block, menu blocks and submenu blocks used during menu operations. State 400 also controls the accumulation of various menu and submenu item selections made by the user through manipulation of the mouse buttons.

When the user releases menu button 26 to terminate a menu session, the system transfers from Menu State 400 to the Menu Done state 500. In the Menu Done state, the operator's final item selections are added to the accumulation of prior selections, the menu graphics are erased, appropriate control words are reset, and a selection message is compiled and transmitted to the application system to enable the user's menu selections to be executed.

Figure 3:
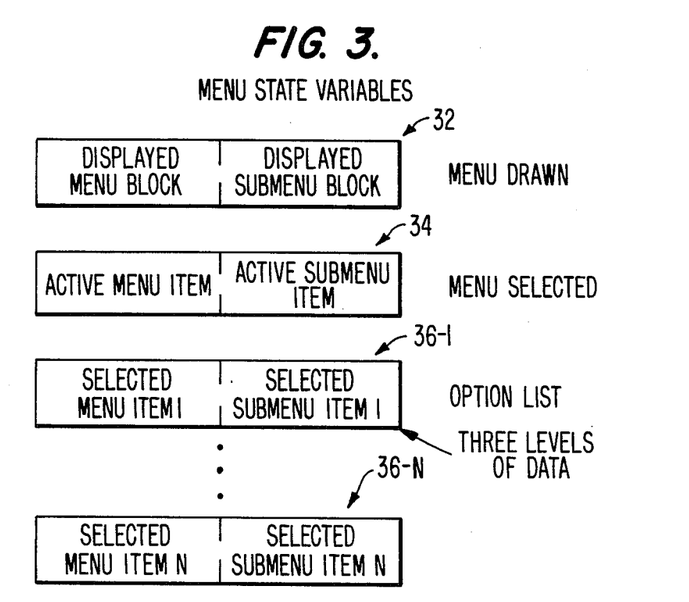
FIG. 3 is a schematic diagram illustrating the composition of various Menu State data words (variables) utilized in the system of the invention.

FIG. 3 schematically illustrates three forms of control words (variables) used within the menu control system of the present invention. MenuDrawn variable 32 contains a first field which stores coded data representing the particular menu block which is currently being displayed. The second field of the Menu Drawn variable indicates the particular submenu block, if any, which is currently being displayed. The Menu Selected variable 34 has a first field which indicates the currently active menu item and a second field which indicates the currently active submenu item, if any. A menu or submenu item is active when the mouse-controlled cursor symbol is positioned within the item block displayed on the screen.

The OptionList variables 36-1 through 36-N represent, in a first field, menu items which have actually been selected during the menu session by the operator. The second field of each of the OptionList words records the submenu items which actually have been selected during the menu session. The selected menu item is indicated by encoding which identifies the particular menu block and the particular menu item within that block which has been selected. Similar coding is employed in the second OptionList field to identify a selected submenu item.

Figure 4:
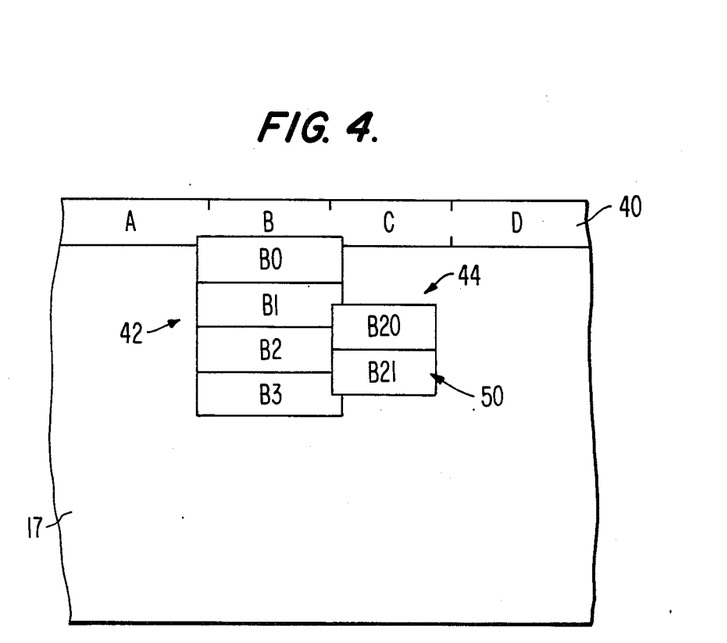
FIG. 4 is a schematic diagram of a typical display screen presentation illustrating the appearance of the header block, menu block, and submenu block employed in connection with the system of the invention.

FIG. 4 schematically illustrates an example of the screen graphics utilized to present particular menu options to the operator. A header block 40 runs across the top of the display screen 17 and includes four subareas A, B, C, and D. The operator manipulates the mouse 10 to position the cursor 50 in a selected subarea. In actual practice, the designations "A", "B", etc. would be replaced by file names, functional operations, format options, and the like. In the case of FIG. 4, when the operator positions cursor 50 within subarea B, the control software generates a display of menu block 42. Menu block 42 includes four subareas B0, B1, B2, and B3 representing four menu items which may be selected by the operator. When the operator moves the cursor 50 into item box B2, the control software automatically generates a display of submenu block 44. The latter includes two subareas B20 and B21 representing two possible submenu options. Menu items may or may not be associated with a submenu, depending on the election of the programmer.

The condition of the display illustrated in FIG. 4 is recorded within the system by MenuDrawn variable 32 (FIG. 3) which contains in its first field an encoded identification of menu block 42 and in its second field an encoded identification of submenu block 44. MenuSelected variable 34 has its first field encoded to indicate that the active menu item is B2. The second field of the MenuSelected word is encoded to indicate that the active submenu item is B21. As will hereinafter be described in detail, if the operator depresses select button 28 when the menu display is in the condition illustrated in FIG. 4, an OptionList word 36 is generated. The first field of the OptionList word is encoded to indicate that the selected menu item is item B2 of menu block 42 and the second field of the generated OptionList word is encoded to indicate that the selected submenu item is item B21 of submenu block 44. Since the operator continues to hold menu button 26 in the depressed position, the menu session is not terminated and the operator can further manipulate the cursor 50 and the button 28 to make further choices and generate further OptionList words.

If the operator releases the menu button 26 when the menu display is as shown in FIG. 4, the menu session is terminated and the same OptionList word, described above, is generated.

Figure 5A:
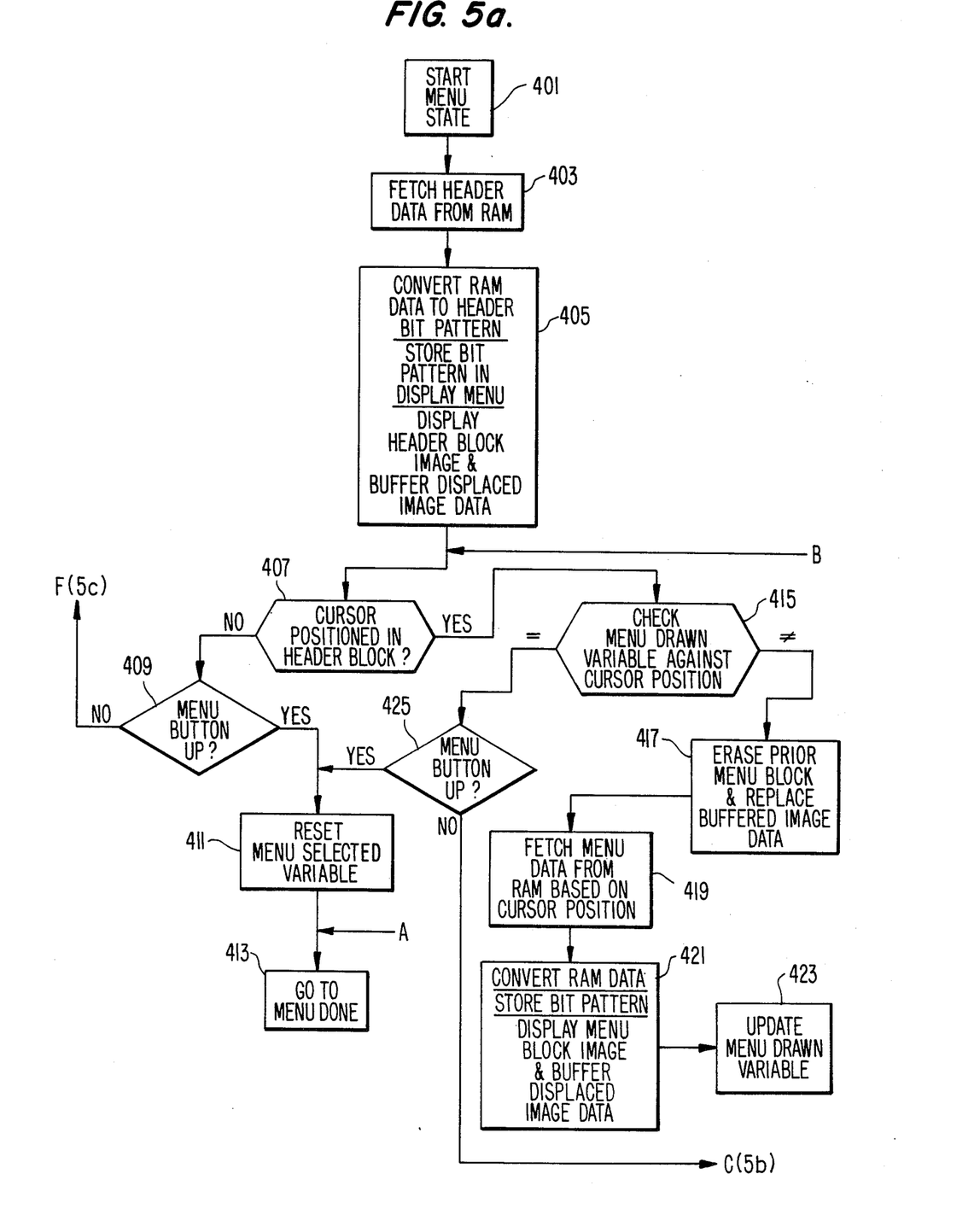
FIGS. 5a–5c are functional flow chart diagrams illustrating the control software which is executed during operations of the system within the Menu State of FIG. 2.
Figure 5B:
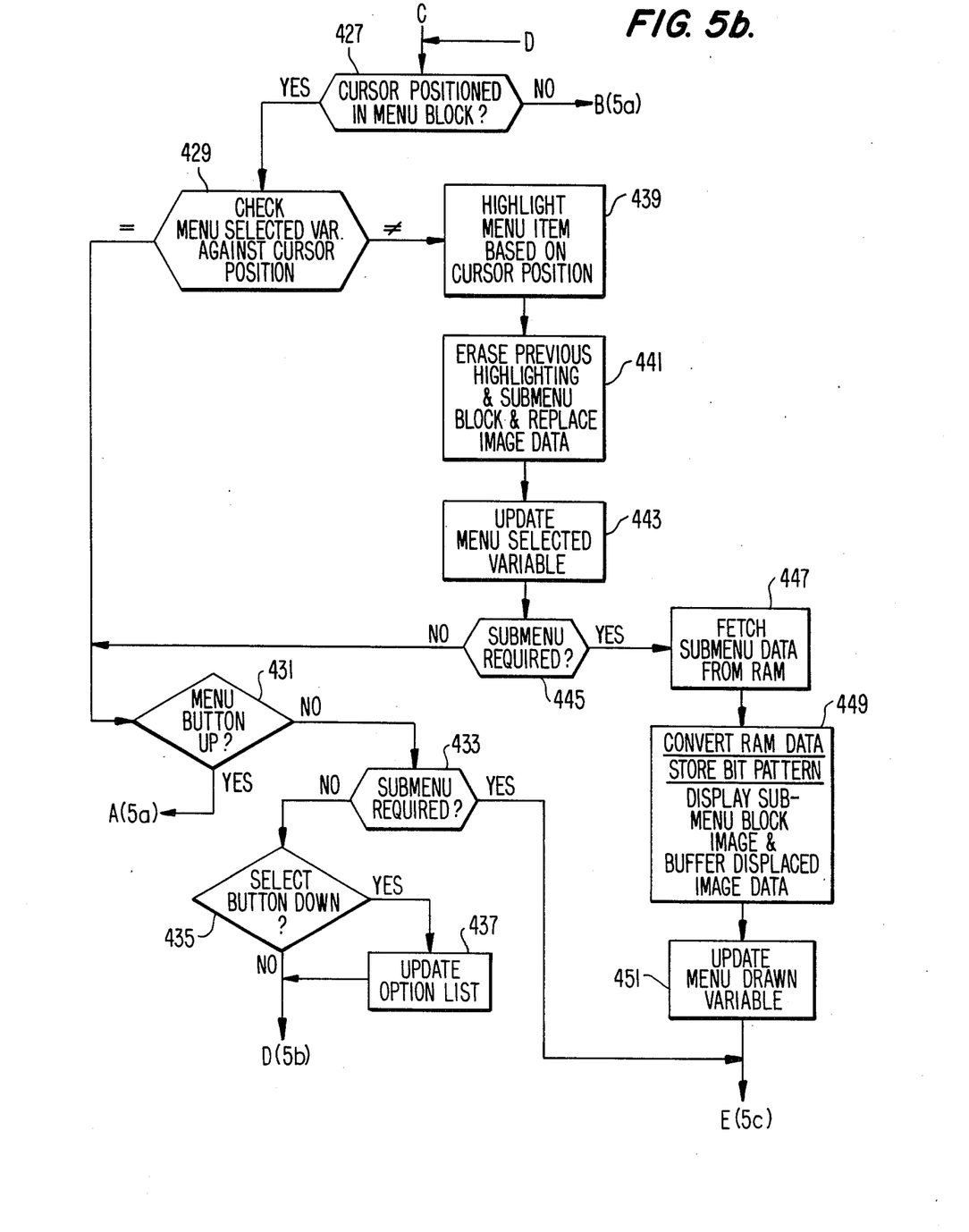
Figure 5C:
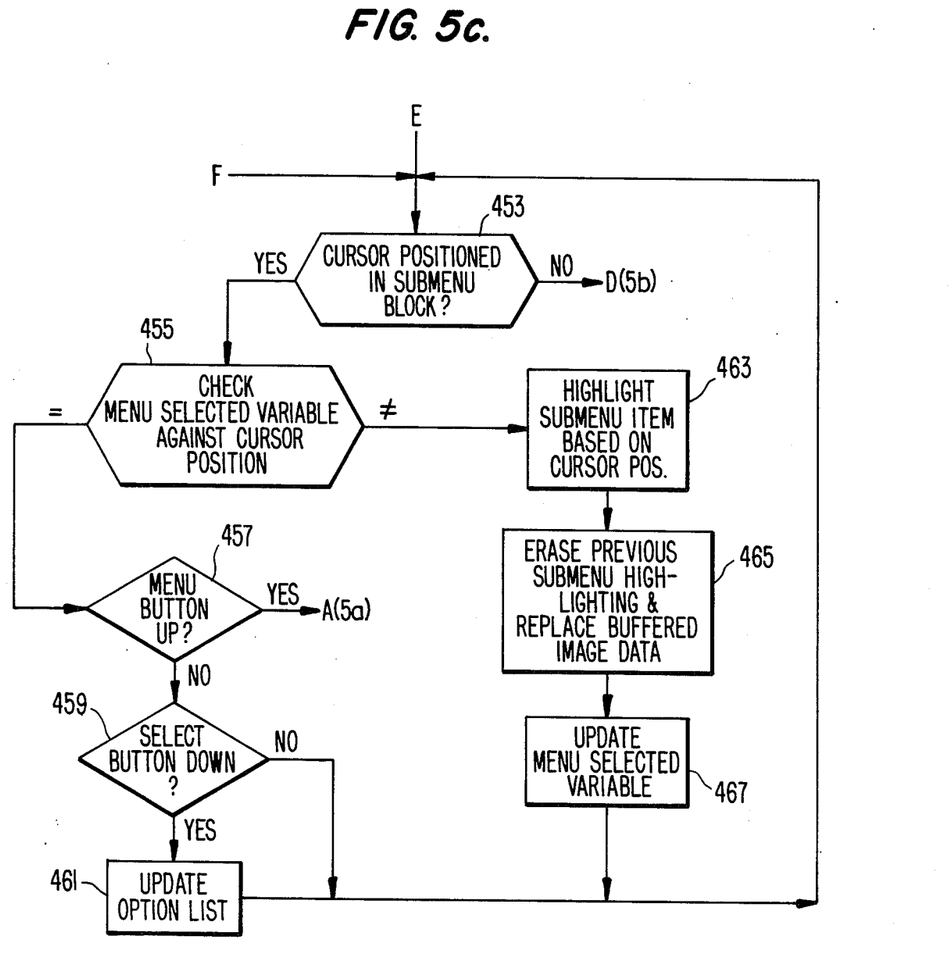

FIGS. 5a-5c illustrate in functional flowchart form the control software which is employed in the present invention to carry out the functions of Menu State 400. As previously noted, the Menu State is entered when the operator depresses menu button 26 and special intervention is not required. The control program proceeds from Start Menu State 401 (FIG. 5a) to step 403, which causes data representative of the header block, e.g., block 40 of FIG. 4, to be fetched from the RAM memory 20.

RAM 20 stores all the data which defines the header block or blocks, menu blocks and submenu blocks required to implement menu operations for a particular application program. This menu data, as well as the appropriate control software, is initially stored on a disk loaded into disk drive 14 (FIG. 1). When the disk data is initially loaded into the CPU, or otherwise accessed during system operation, data structures containing the menu data are transferred to RAM 20. Each basic data structure defines a particular header block, menu block or submenu block in terms of the text and/or graphics needed to display the block. The data structure also contains certain format data necessary to define the location of the block on the display screen, the size and shape characteristics of the block, color, etc. The data structures can be accessed within RAM 20 in any desired manner, for example, by chaining menu block structures to their associated header block structure and by chaining submenu block structures to their associated menu block structure.

In step 403 of FIG. 5a, the particular header block data structure which is called for by the application program is read from RAM and, in step 405, is converted to a bit pattern which represents a visual depiction of the header block. The bit pattern is loaded into a particular off-screen section of the display memory 22 (step 405) and is thereafter displayed by the video interface circuit 24 so that it appears as the block 40 running across the top of the screen shown in FIG. 4. VIC 24 operates in a manner such that the image data which is displaced on display screen 17 by the header block image data is buffered in the proper pixel locations within the off-screen section of the display memory. When the header block is later erased the buffered image data is reinserted into the video to restore the screen presentation to its full size.

After the header block is displayed, step 407 is executed to determine whether the cursor is positioned within the area of the header block image. This is done by comparing the current cursor position, derived from the input signals from mouse 10, with the header block location data stored in the header block data structure. If the cursor is not within the header block, step 409 checks to see if the menu button has been released and if it has not, returns to step 407 via a scan loop to be described subsequently. This loop is repeated until the operator has manipulated the mouse 10 to bring the cursor within the area of the header block. When this occurs, the software exits step 407 to step 415, where the MenuDrawn control word 32 is checked against the current cursor position. Since the Menu State has just been entered, the MenuDrawn variable is in its reset state, whereupon an unequal is produced in step 415 and the program exits to step 417. Since no menu block is currently being displayed, the erase function of step 417 is not effected and the program proceeds to step 419.

In step 419 the appropriate menu data is fetched from the RAM based on the current position of the cursor. The menu block data structure access code is based upon the screen location coordinates of the header block subarea B (assuming the scenario of FIG. 4). Since the cursor position is located within that subarea of the header block, the data for menu block 42 (FIG. 4) is read from the RAM. In step 421 a series of operations similar to those performed in step 405 is executed to convert the menu block RAM data to a bit pattern which is then displayed in the form of block 42 shown in FIG. 4. It is noted that the menu block image is displayed directly below and slightly overlapping the header block subsection B.

The program next proceeds to step 423, wherein the MenuDrawn control word 32 is updated to indicate the menu block which is then being displayed. Since at this time no submenu block is displayed, the second field of the MenuDrawn variable 32 remains in the reset condition. The program then exits step 423 to step 427, shown in FIG. 5b.

In step 427 the software checks to determine whether the cursor is positioned within the displayed menu block. This is done by matching the current cursor position data received from mouse 10 against the menu block location coordinates stored in the menu block data structure. If the operator has not yet moved the cursor into the menu block to select a menu item (the operator may be sweeping the cursor through the header block and may never actually move it into the displayed menu block), the program jumps back to step 407. Assuming the cursor is still positioned within the header block, step 415 is repeated. If the cursor has been moved to a different subsection of the header block, step 415 will produce an unequal result and steps 417, 419, 421 and 423 will be executed to erase the previous menu block and to display a new menu block associated with the header block subsection in which the cursor currently resides.

If, however, the operator is in the process of moving the cursor from the header block subsection into the displayed menu block, but has not yet entered the menu block, step 415 produces an equal result and the software proceeds through step 425 to step 427 (FIG. 5b) and will traverse the 427-407-415-425 loop until the cursor enters the displayed memory block. When this occurs step 427 transfers the path of execution to step 429.

In step 429 the MenuSelected variable 34 is checked against the cursor position and an unequal result is produced. This result occurs because the MenuSelected control word is still in the reset state and the cursor position corresponds to the location code for the menu item B0. This results in the exeeution of program steps 439, 441 and 443. In step 439 the menu item in which the cursor presently resides (B0) is highlighted. This may be done in a variety of ways, e.g., by displaying a heavy borderline around the item box, by changing the color of the box, by inverting the box image, etc. The highlighting function makes it easier for the operator to observe which menu item is currently being presented as a candidate for possible selection.

In step 441 any previous menu item highlighting and any previously displayed submenu block image is erased and the buffered image data representing the erased material is fed back into the video. Step 443 causes the MenuSelected variable 34 to be updated to reflect in field 1 the code of the currently active (highlighted) menu item, i.e., item B0 shown in FIG. 4.

When step 445 is encountered the displayed menu block data structure is checked to determine whether the active menu item requires display of a submenu block. If so, program steps 447, 449 and 451 are executed. In step 447 RAM 20 is accessed to read out the data structure defining the required submenu block. In step 449 a series of operations similar to those performed in steps 405 and 421 are executed to convert the submenu data into a bit pattern, which is then stored in an off-screen section of the display memory and subsequently displayed on the CRT screen. When the display is initiated, the displaced image data is transferred into the same off-screen memory section for buffering. In step 451 the MenuDrawn variable 32 is updated to indicate in its second field the currently active (displayed) submenu block, e.g., block 44 shown in FIG. 4.

Had the currently active menu item not required display of a submenu block, program step 445 would have caused a branch to step 431. The latter step determines whether the menu button 26 is still depressed and, if so, diverts the program through step 433 to step 435 to determine whether the operator has depressed the select button 28. If the select button has not been depressed, the program returns to step 427 (FIG. 5b). The program steps between 427 and 435 are repeatedly traversed while the cursor is positioned within a menu block to monitor the progress of the cursor from item to item in order to generate the appropriate highlighting and to keep the MenuSelected variable updated to constantly reflect the currently active menu item.

If the operator decides to select one of the menu items within the displayed menu block, and desires to make the selection the last (or only) selection of the current menu session, the operator releases menu button 26 when the cursor resides in the desired menu item box. When this occurs the program exits step 431 to step 413 (FIG. 5a), whereupon the Menu State is terminated and the program transitions to the Menu Done state 500 (FIG. 2).

If, however, the operator wishes to select a menu item without terminating the menu session, the operator depresses the select button 28 while continuing to hold the menu button down. In this case the program branches at step 435 (FIG. 5b) to step 437 before returning to step 427 to continue tracking the progress of the cursor through the menu block. In step 437 a new OptionList variable is created and added to the list (FIG.

3). The new OptionList word is encoded to reflect the data in the current MenuDrawn variable 32 and MenuSelected variable 34, which identifies the menu item pointed to by the cursor at the time the select button is depressed.

In the case where display (highlighting) of the active menu item (the item in which the cursor currently resides) calls for display of a submenu block, the program branches through step 445 to steps 447, 449, 451 and 453 (FIG. 5c) and reverts back to step 427. Thereafter, until the cursor either moves to a new menu item or enters the submenu block, the program proceeds from step 427 through step 429, 431, 433, 453 and 427 in a repeating loop to monitor the progress of the cursor. It is noted that the program does not allow the operator to use the select button to select a menu item when that item is associated with a submenu. As explained subsequently, a valid selection is recognized in such a case only if the cursor is positioned in the submenu.

If the cursor enters the submenu block, the program branches at step 453 to step 455, whereupon the program branches through steps 463, 465 and 467 since the submenu field of the MenuSelected variable is still reset. These steps are similar to steps 439, 441 and 443 and operate to highlight the active submenu item and to update the MenuSelected variable to reflect the active submenu item. If the operator selects a submenu item by releasing the menu button or by depressing the select button, the program (FIG. 5c), in the former case, branches through step 457 to step 413 (FIG. 5a), terminating the menu session and proceeding to the Menu Done state.

If a submenu item is selected through depression of the select button 28, the program branches through step 459 (FIG. 5c) to step 461 before returning to step 453 to resume tracking the progress of the cursor through the submenu block. In step 461, a new OptionList word is generated to extend the accumulated list of menu and submenu item selections. The new OptionList variable is encoded to reflect the identity of the menu and submenu items which are active at the time the select button is depressed.

If the operator moves the cursor out of the submenu block and back into the menu block without making a submenu item selection, the program branches through step 453 back to step 427 (FIG. 5b), whereupon the next menu item is highlighted and presented as a possible candidate for selection.

Special codes are used in the MenuSelected variable 34 to identify those menu items which are associated with submenus. This enables the system to recognize an error condition in a case where the operator selects the menu item by releasing the menu button, but fails to select an associated submenu item.

If the operator moves the cursor out of the menu block and back into the header block, the program branches through step 427 (FIG. 5b) back to step 407 (FIG. 5a) to track the progress of the cursor through the header block and to present new menu and submenu blocks as candidates for possible selection. If the operator moves the cursor out of the header block, menu block and submenu block areas altogether, the program traverses the loop including steps 407, 409, 453 and 424 until the operator either releases the menu button or moves the cursor back into a menu area. When the button 26 is released, the program branches through steps 409 and 411 and proceeds to the Menu Done state.

Figure 6:
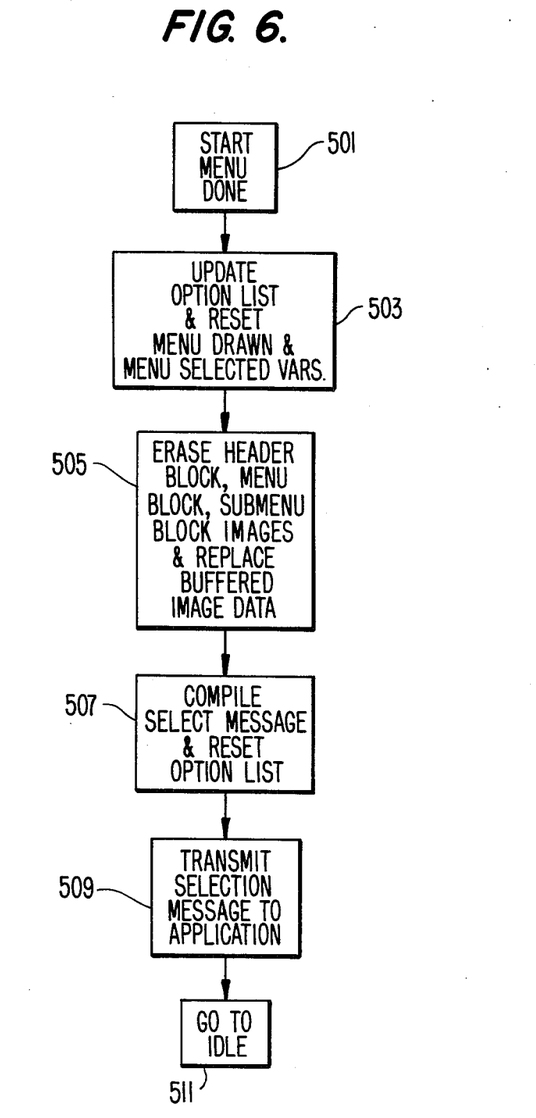
FIG. 6 is a functional flow chart diagram illustrating the software which is executed by the system of the invention when it is in the Menu Done state of FIG. 2.

FIG. 6 illustrates the software which is executed during the Menu Done state 500. From start step 501 the program proceeds to step 503, whereupon the last OptionList variable is added and the MenuDrawn and MenuSelected variables are reset. Addition of the last OptionList variable involves a step similar to the previously described steps 437 and 461 wherein a new OptionList word is generated to reflect the status of the MenuDrawn and MenuSelected variables 32 and 34, respectively, at the time the menu button is released.

Thus, in the case where the operator selects a single menu or submenu item during a menu session by positioning the cursor to the selected item and releasing the menu button, a single OptionList variable 36-1 is generated as soon as the Menu Done state is entered. In the case where the operator has selected one or more menu or submenu items during the menu session by operating the select button and then selects a final item by appropriately positioning the cursor and releasing the menu button, the system enters the Menu Done state with all but the last OptionList variable included in the selection list. The finally selected item is added to the OptionList variables during the execution of step 503.

Thereafter, in step 505 the software operates to erase all of the displayed blocks and replaces the buffered image data to restore the full screen area. In step 507 a selection message is compiled including all existing OptionList variables. In step 509 the selection message is transmitted to the application program to convey the operator's menu item selections to the system for subsequent application. Finally, the software proceeds back to the Idle state to await the next menu session.

Summarizing, the operation of the system of the present invention is as follows.

When the operator depresses menu button 26, the menu header block 40 (FIG. 4) previously absent from the display screen, is brought up on the display. By manipulating the mouse, the operator moves the cursor 50 into the header block 40 and as soon as the cursor enters the header block, a menu block 42 is displayed, depending upon which of the header subsections A–D represents the entry point of the cursor. The operator may then move the cursor horizontally along the header block and as each new subsection is entered a new menu block is displayed, the previously displayed block being erased.

If the operator moves the cursor into a menu block, the menu item box in which the cursor is positioned will be highlighted. If a submenu is associated with the menu item, it is automatically displayed adjacent to the menu item as a submenu block 44 (FIG. 4). As the operator continues to scan the cursor through the menu block, the item highlighting follows the position of the cursor. When the cursor is moved out of a menu item box having a submenu associated with it, the submenu is erased. When the operator moves the cursor into a submenu box, the submenu item in which the cursor is positioned will be highlighted, as in the case of the menu item.

Any time the operator depresses the select button 28 when the cursor is positioned in a highlighted (active) menu or submenu item box, an OptionList word is generated and added to the collection of OptionList variables, provided that the selected item is not already represented in the existing selection list. An exception to this OptionList variable generation process is, as previously explained, the case where the select button is depressed in an active menu item which has a submenu associated with it. In that case, no OptionList variable is generated.

The operator can continue moving the cursor to new menu and submenu items and selecting such items through depression of the select button 28 (so long as the menu button 26 is held in the depressed position) and the list of selected items will be extended. When the operator selects the last item in a menu session he simply releases the menu button 26, whereupon as previously explained the system transitions into the Menu Done state and enters the last selected item as the final OptionList word. Thereafter, the Menu Done software (FIG. 6) is executed to compile the select message, incorporating all of the selected items, and to transmit the message to the application for subsequent execution.

The system of the invention embodies a "drag select" feature by which the operator can select multiple menu and submenu items simply by holding both the menu and select buttons depressed while moving the cursor through a number of menu and/or submenu items. Each time the cursor moves into a new menu item box, that item is automatically selected and an appropriate OptionList variable is generated and added to the list (unless the menu item has a submenu associated with it). The manner in which this is done is illustrated, for example, in FIG. 5b. When the cursor enters a new menu item box the software branches through step 429 to steps 439, 441, 443, 445, 431, 433 and 435. Since the select button is being held in the depressed position, the path of execution proceeds to step 437 to generate the new OptionList variable. So long as the cursor remains in that particular menu item box, the program will loop back through steps 427, 429, 431, 433, 435 and 437. However, another OptionList variable will not be generated since the system will not generate redundant OptionList variables during the same menu session.

This same "drag select" function is employed in the case of submenu item selection, as illustrated in FIG. 5c. In that case, with the menu and select buttons both held in the down position, the program branches through steps 453 and 455 and proceeds through steps 463, 465 and 467 when the cursor enters a new submenu item box. Thereafter, when step 455 is re-entered the execution path branches to steps 457 and 459 and automatically enters step 461 since the select button is already down. Execution of the latter step automatically generates a new OptionList variable to reflect the automatic selection of the newly entered submenu item.

If the operator moves the cursor outside of either a menu block or a submenu block, so that the cursor is not in any header, menu or submenu block, the software will branch from step 453 (FIG. 5c) to step 427 (FIG. 5b) to step 407 (FIG. 5a). Thereafter, the path of execution follows through step 409 back to step 453 (FIG. 5c) where the same loop is re-traversed. This loop will be repeated indefinitely until the operator either releases menu button 26 or moves the cursor back into one of the displayed blocks. As soon as one of the blocks is re-entered, the software will branch through the appropriate step 453, 427 or 407 to update the display and enable new candidates for selection to be presented.

It will be apparent to those skilled in the art that various modifications and variations can be made to the embodiment of the invention as hereinabove described without departing from the spirit and scope of the invention.

What is claimed is:

1. In a computer system for displaying operator selectable menu items and a cursor image, said system having memory means and an operator controllable cursor positioning device with selection signal generating means, a method comprising the steps of:
   storing in a first section of said memory means header data representing a menu header block and menu data representing a plurality of menu blocks;
   transferring to a second section of said memory means in response to generation of a first selection signal a header bit pattern derived from said header data, said bit pattern representing a visual depiction of said menu header block; and
   displaying a menu header block image based on said header bit pattern stored in said second memory section.

2. The method of claim 1 comprising the further steps of:
   positioning said cursor image in a selected location within said displayed header block;
   transferring to said second memory section in response to said positioning a menu bit pattern derived from said menu data, said menu bit pattern representing a visual depiction of a selected one of said menu blocks, the selected menu block corresponding to the location of said cursor image within said header block and containing a plurality of selectable menu items; and
   displaying a menu block image based on said menu bit pattern.

3. The method of claim 2 wherein said displayed menu block image is positioned below said header block image in proximity to the location of said cursor image.

4. The method of claim 2 comprising the further steps of:
   positioning said cursor image within said displayed menu block image to a location designating a selected menu item; and
   storing in said memory means in response to said last-mentioned positioning a control word representing said selected menu item.

5. The method of claim 4 comprising the further steps of:
   generating a second selection signal; and
   compiling in response to said second selection signal a menu item selection message containing said control word.

6. The method of claim 5 in which said selection signal generating means comprises an operator controllable selection button which is depressed to generate said first selection signal and which is released to generate said second selection signal.

7. The method of claim 4 comprising the further steps of:
   storing in said first memory section submenu data representing a plurality of submenu blocks;
   transferring to said second memory section in response to said last-mentioned positioning a submenu bit pattern derived from said submenu data, said bit pattern representing a visual depiction of a submenu block, said submenu block corresponding to said selected menu item and containing a plurality of selectable submenu items; and
   displaying a submenu block image based on said submenu bit pattern stored in said second memory section.

8. The method of claim 7 wherein said displayed submenu block image is positioned adjacent to said menu block image in proximity to the location of said cursor image.

9. The method of claim 7 comprising the further steps of:
- positioning said cursor image within said displayed submenu block to a location designating a selected submenu item; and
- storing in said memory means in response to said last-mentioned positioning a control word representing said selected submenu item.

10. The method of claim 9 comprising the further steps of:
- generating a second selection signal; and
- compiling in response to said second selection signal a menu item selection message containing said menu item and submenu item control words.

11. The method of claim 10 wherein said menu item control word is coded to indicate to said system that a submenu control word must be present in said menu item selection message to convey valid selection data.

12. In a computer system for displaying operator selectable menu items and a cursor image, said system having memory means and an operator controllable cursor positioning device with selection signal generating means, a method comprising the steps of:
- displaying a menu block containing areas designating a plurality of selectable menu items;
- storing in a first section of said memory means a control word representing the menu block area in which said cursor image is positioned, said stored control word being changed when said cursor image is moved to reflect the menu block area in which said cursor image is currently positioned; and
- compiling a selection message in response to generation of a selection signal, said message including the control word in said first memory section at the time said selection signal is generated.

13. In a computer system for displaying operator selectable menu items and a cursor image, said system having memory means and an operator controllable cursor positioning device with selection signal generating means for generating a plurality of first and a second selection signal a method comprising the steps of:
- displaying a menu block containing areas designating a plurality of selectable menu items;
- storing in a first section of said memory means a control word representing the menu block area in which said cursor image is positioned, said stored control word being changed when said cursor image is moved to reflect the menu block area in which said cursor image is currently positioned;
- transferring to a second section of said memory means from said first memory section a plurality of different control words, each of said plural control words being transferred in response to generation of a different one of said first selection signals; and
- compiling a selection message in response to generation of said second selection signal, said message including said plural control words present in said second memory section at the time said second selection signal is generated.

14. The method of claim 12 comprising the further step of storing in said first memory section a control word having a null value when said cursor image is positioned outside the boundaries of said menu block, whereupon compilation of said selection message to include said null value control word indicates the absence of a menu item selection.

15. The method of claim 13 in which said selection signal generating means comprises first and second operator controllable selection buttons, said plurality of first selection signals being generated by depressing said second button a plurality of times while said first button is held in the depressed position and said second selection signal being generated by releasing said first button.

16. The method of claim 15 comprising the further step of generating a first selection signal in response to changing of the control word stored in said first memory section at a time when both said selection buttons are in the depressed position.

* * * * *

UNITED STATES PATENT AND TRADEMARK OFFICE
CERTIFICATE OF CORRECTION

PATENT NO. : 4,772,882

DATED : September 20, 1988

INVENTOR(S) : Robert J. Mical

It is certified that error appears in the above-identified patent and that said Letters Patent is hereby corrected as shown below:

IN THE CLAIMS:

Claim 1, column 10, line 5, after "means," insert --including a menu mode actuator,--; and line 11, after "signal" insert --produced by activation of said menu mode actuator,--.

Claim 11, column 11, line 19, after "submenu" insert --item--.

Signed and Sealed this

Fifth Day of March, 1991

Attest:

HARRY F. MANBECK, JR.

*Attesting Officer*  *Commissioner of Patents and Trademarks*